United States Patent [19]

Coon

[11] Patent Number: 5,448,833
[45] Date of Patent: Sep. 12, 1995

[54] CUTTING INSTRUMENT OR TOOL

[76] Inventor: Michael Coon, 82 Devil's Garden Rd., Rowayton, Conn. 06853

[21] Appl. No.: 139,875

[22] Filed: Oct. 22, 1993

Related U.S. Application Data

[63] Continuation-in-part of Ser. No. 908,059, Aug. 6, 1992, abandoned.

[51] Int. Cl.⁶ ............................................. B26B 3/08
[52] U.S. Cl. ......................................... 30/142; 30/355; 30/357; 30/517
[58] Field of Search ................. 30/514, 517, 518, 519, 30/520, 142, 355, 357, 507, 501, 503.5

[56] References Cited

U.S. PATENT DOCUMENTS

| | | | |
|---|---|---|---|
| D. 214,415 | 6/1969 | Lynn et al. | |
| D. 266,375 | 10/1982 | Hahn | |
| D. 266,392 | 10/1982 | Hoffberger | |
| D. 291,764 | 9/1987 | Mark | |
| D. 303,603 | 9/1989 | Zimmerman | |
| 494,103 | 3/1893 | Hotchkiss | 30/517 |
| 508,975 | 11/1893 | Randolph et al. | 30/519 |
| 552,342 | 12/1895 | White | 30/519 |
| 2,527,018 | 10/1950 | Luzzi | 30/142 |
| 2,750,669 | 6/1956 | Hohmann | 30/355 |
| 2,938,267 | 5/1960 | Tupper | 30/142 |
| 2,973,578 | 3/1961 | Carroll et al. | |
| 3,024,533 | 3/1962 | Nitsch | |
| 3,673,685 | 7/1972 | Eppolito | 30/142 |
| 4,011,068 | 10/1983 | Theodorides | 30/517 |
| 4,823,467 | 4/1989 | Campbell et al. | |
| 4,841,638 | 6/1989 | Barden et al. | 30/517 |

FOREIGN PATENT DOCUMENTS 186328 9/1936 Switzerland ......................... 30/517

*Primary Examiner*—Rinaldi I. Rada
*Attorney, Agent, or Firm*—Alfred E. Miller

[57] ABSTRACT

A hand saw principally for use on sheet rock or gypsum wall board having a bi-partite handle and a thumb stop. The saw blade is provided with in-line teeth which cut on the forward and backward motion of the saw and which are provided with large cleanouts. The cutting teeth are also in line and the saw blade itself is thicker on the cutting surfaces than on the top. The arrangement permits a higher grade of premium steel to be used and the teeth can be readily sharpened. The saw may also have a blade that is sharpened on the top to a cutting edge resulting in an all purpose cutting instrument.

13 Claims, 5 Drawing Sheets

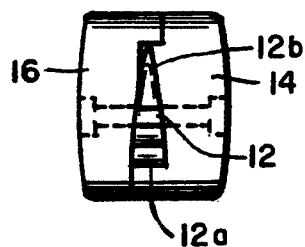
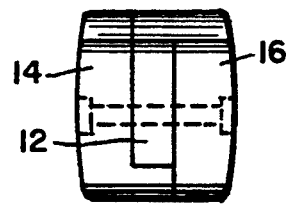
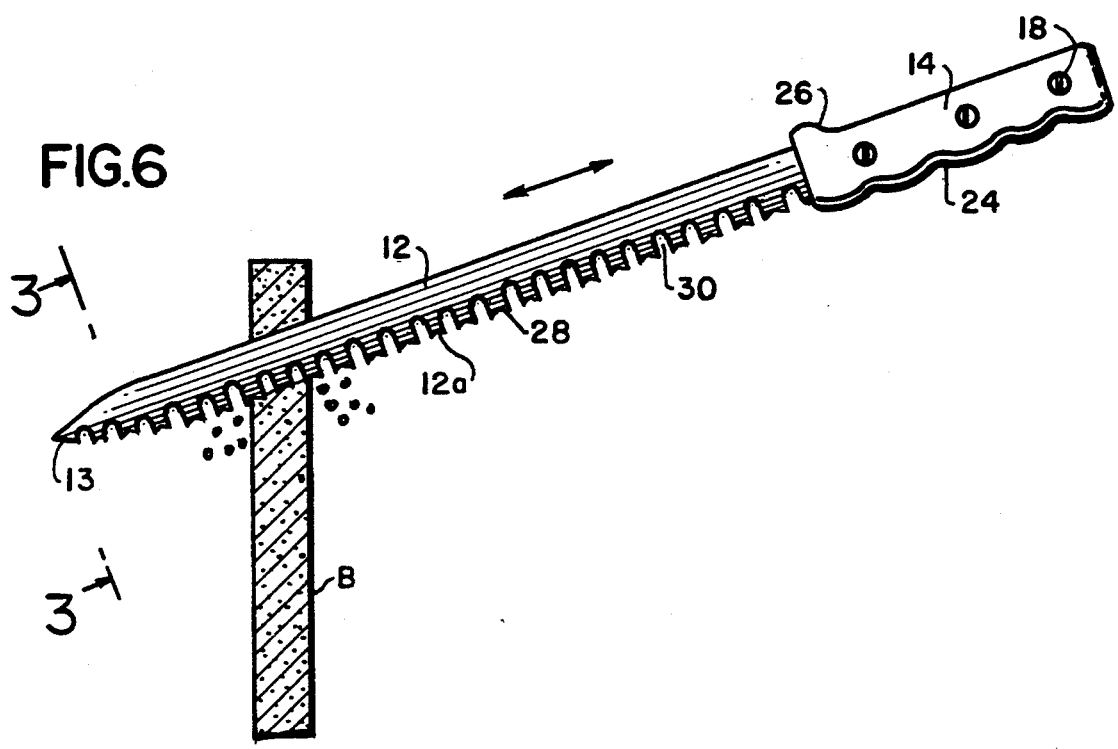
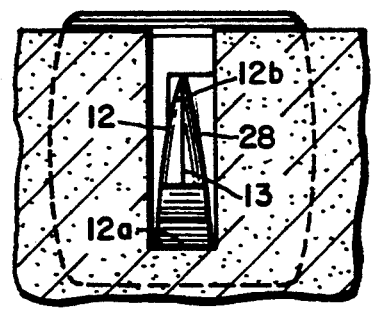

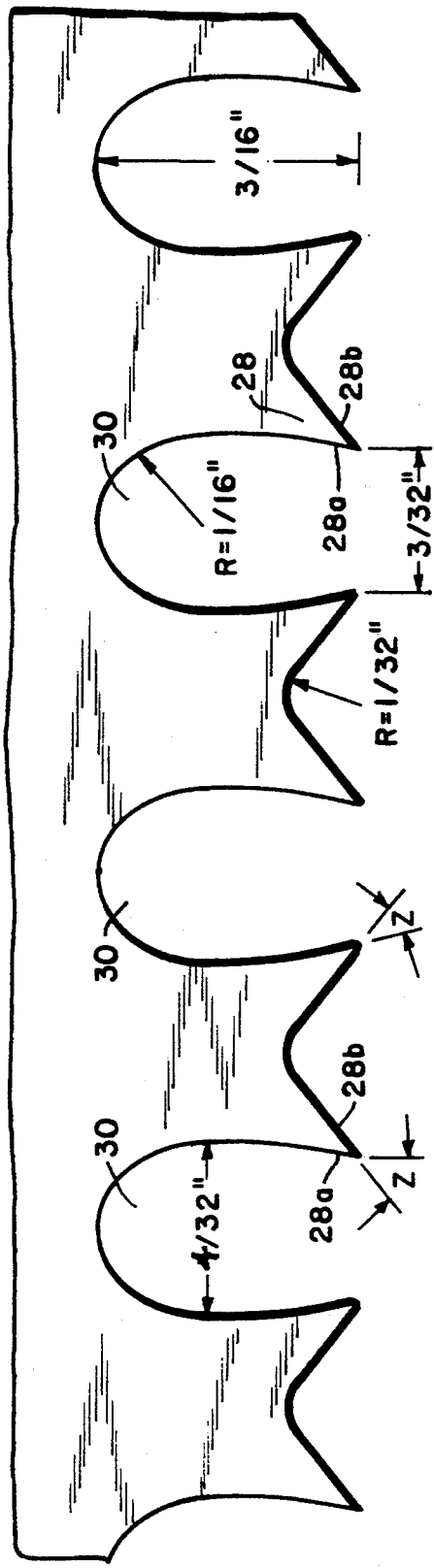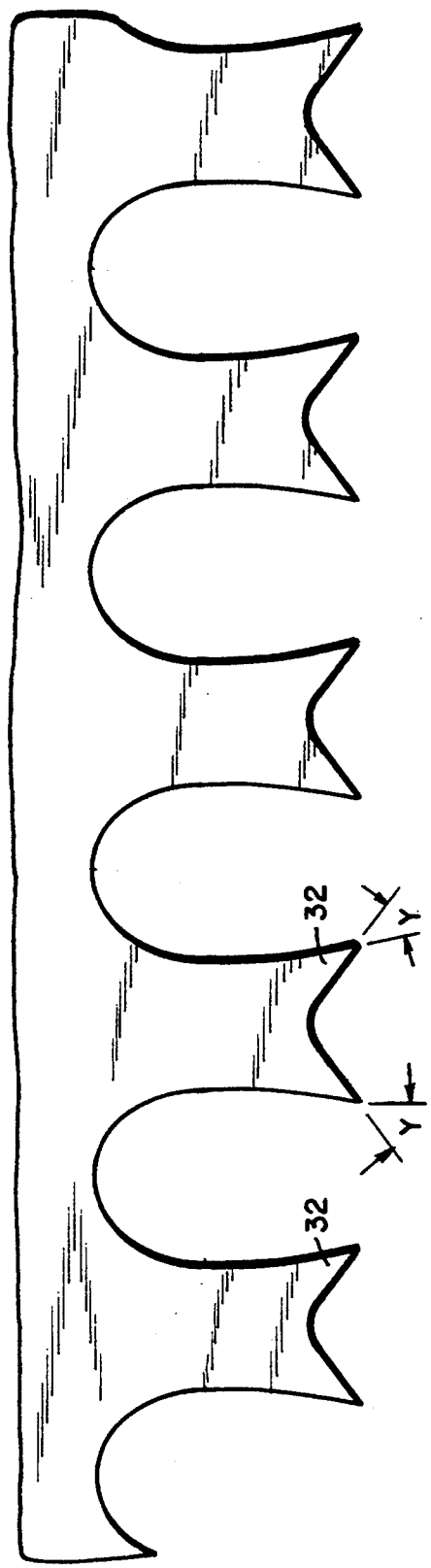

CUTTING INSTRUMENT OR TOOL

This application is a continuation-in-part, of application Ser. No. 07/908,059, filed Aug. 6, 1992, now abandoned.

FIELD OF THE INVENTION

The present invention relates to a cutting instrument or tool which can be a hand saw that is particularly useful in cutting sheet rock but in another embodiment can be useful as an all purpose knife for cutting various types of products, such as all types of foods, including frozen foods.

BACKGROUND OF THE INVENTION

It is customary to use a hand saw in order to cut sheet rock or gypsum board in the construction trades. The sheet rock saws presently being used are provided with offset teeth of the type shown in U.S. Pat. No. 2,973,578 to Carroll et al. These saws generally are of about 7-8 inches in length and are provided with a cylindrically shaped handle. Since it is well known that the gypsum composition of sheet rock or plaster board tends to crumble when sawing, it is important to have a blade that cuts cleanly and does not bind during the sawing operation. However, the offset teeth of a saw of the type shown in the Carroll patent can not be made of high grade steel since the teeth must be bent and therefore cannot be effectively sharpened. Moreover, since the blade is of lesser grade steel, the useful life of the blade is considerably shortened.

In order to overcome the drawbacks of prior art constructions the present invention has been developed. It has the following properties that have never been used in combination before in saws especially used for sheet rock or plaster board cutting and trimming.

SUMMARY OF THE INVENTION

It is a feature of the invention to provide a hand saw for sheet rock or plaster board in which all the teeth are in-line so they can be easily sharpened when necessary.

Another feature of the present invention is to permit the saw blade to be made of higher grade steel, for example, high carbon steel which will result in a long lasting saw that can be easily sharpened. The blade may also be fabricated of steel that resists rusting.

An object of the present invention is to utilize a saw blade that is thicker on the bottom and narrower on the top. This construction keeps the saw from binding when sawing through material such as sheet rock. A further feature of the present invention is to have both the teeth shape and cutting surface of such a construction that the saw cuts during both the push and the pull cycle while sawing.

Another object of the present invention is to provide a multiple-spaced toothed construction on a saw blade having a relatively large clean out portion which is elliptical in configuration.

A further object of the present invention is to provide a sharpened free end of the knife blade which can be used to score material to be cut.

Another feature of the present invention is to provide a two part handle which can be assembled with the end of the blade passing through the entire handle portion. The handle also provides a thumb stop and a comfortable hand grip while sawing through sheet rock or other material.

In order that the invention may be more clearly understood, it will now be disclosed in greater detail with reference to the accompanying drawings in which:

FIG. 4 is a view taken along the lines 4—4 of FIG. 3.

FIG. 5 is a view taken along the lines 5—5 of FIG. 3.

FIG. 6 is a side elevational view of the sheet rock saw cutting board material in which, for example, the gypsum flakes or particles are spread forward and backward of the board material upon pushing and pulling of the saw.

FIG. 7 is a view taken along line 3—3 of FIG. 6 showing the blade as it cut through board material.

FIG. 8 shows the saw teeth construction in elevation of the present invention illustrating the large open clean outs in the spacing between the cutting teeth.

FIG. 9 is a view similar to FIG. 8, however showing more teeth per inch on the saw blade resulting in different dimensions of the teeth as well as the clean out areas.

DESCRIPTION OF THE PREFERRED EMBODIMENTS OF THE INVENTION

Figure 1:
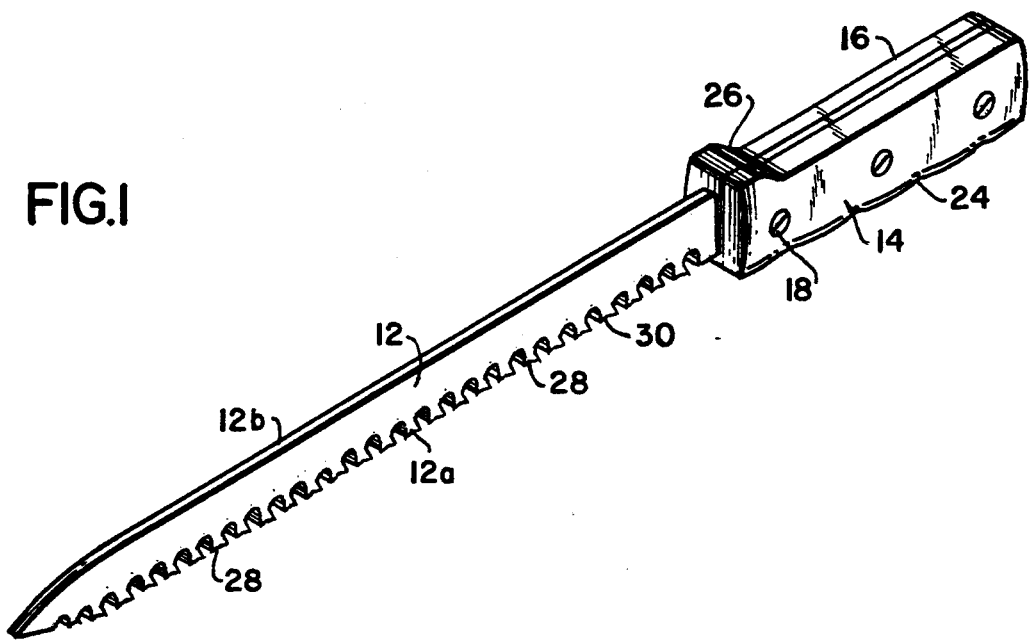
FIG. 1 is a perspective view of the sheet rock saw constructed in accordance with the teachings of my invention.
Figure 2:
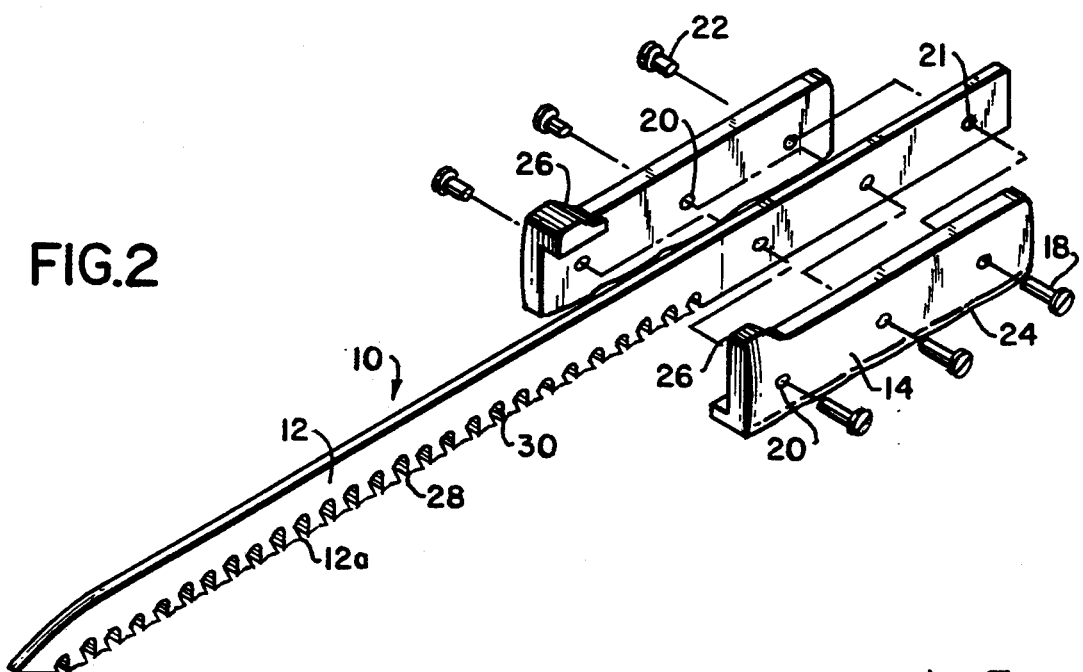
FIG. 2 is an exploded view of the sheet rock saw showing the saw blade and handle disassembled.
Figure 3:
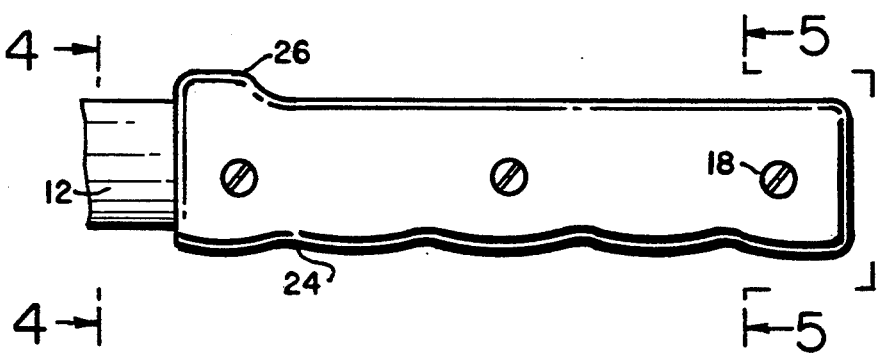
FIG. 3 is a side elevational view of the handle for the saw blade.

As seen in FIG. 1 and FIG. 2, the present hand saw, referred to by the reference numeral 10, is particularly suitable for cutting sheet rock or gypsum board. However, as will be explained hereinafter, other materials can be cut with this type of blade. The saw is provided with a blade 12 and a bi-partite handle 14 and 16. As seen in FIG. 3, the blade 12 extends completely within the handle parts 14 and 16, the latter inter-fitting whereby the screws 18 pass through aligned openings 20 in the handle parts as well as holes 21 in the saw blade 12, and the screws 18 are screw-connected to nuts 22. This feature permits blade 12 to be interchanged when it becomes worn out or broken. The handle also is provided with a finger grip 24 as well as a thumb stop member 26. The shape of the handle is basically rectangular but rounded so that a comfortable grip is maintained when utilizing the finger grips 24 as well as the thumb stop 26 when sawing through sheet rock, or the like.

Figure 12:
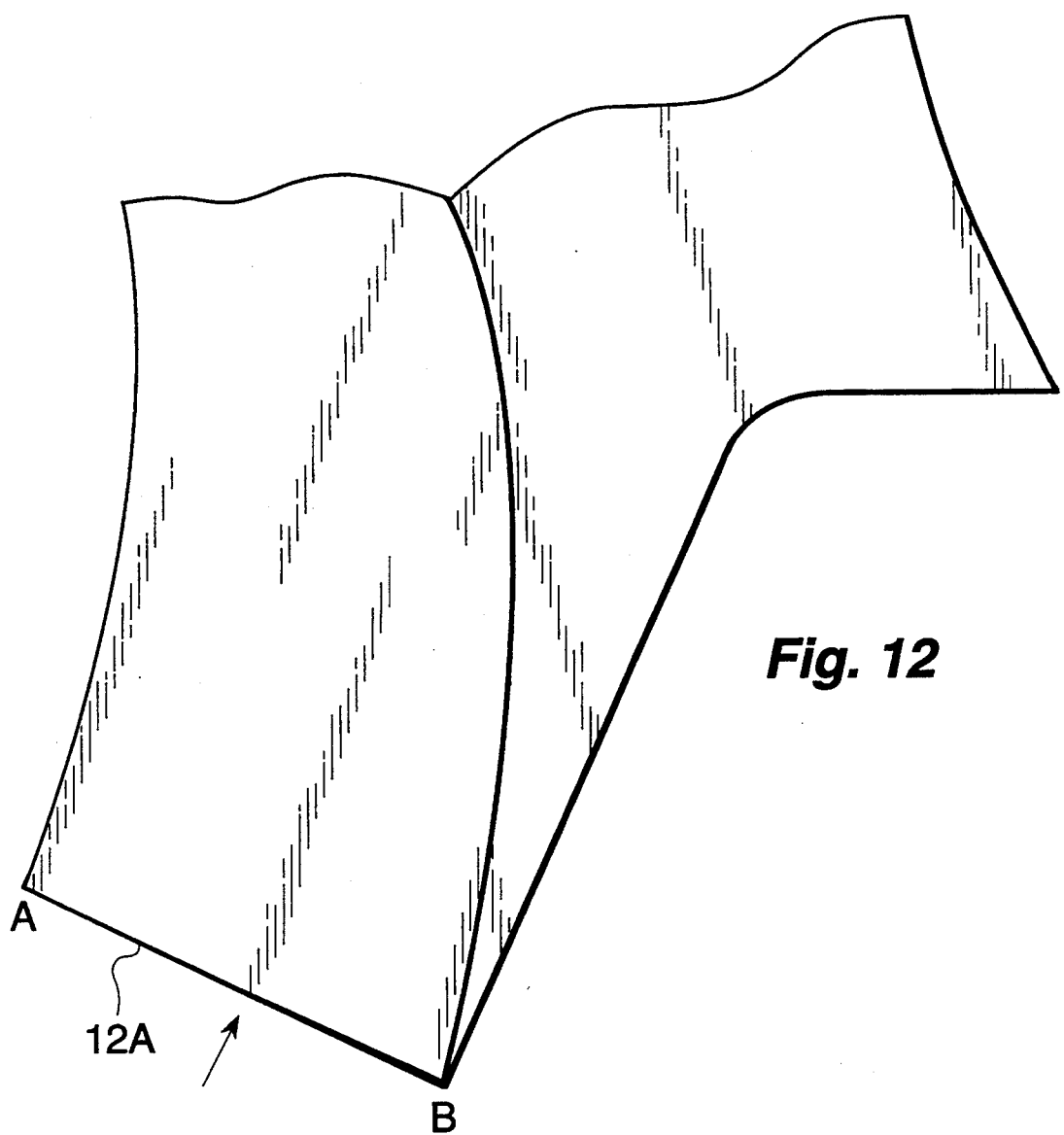
FIG. 12 is an enlarged perspective view of a single cutting tooth of the saw teeth construction shown in FIG. 8, with the tooth applied to a work surface.

As seen in FIGS. 4 and 7 the blade 12 is thicker at the bottom cutting surface 12a than at the top 12b. In fact, the blade becomes progressively narrower from the bottom to the top thus leaving open areas 30 in the saw cut, each being in the shape of an inverted triangle becoming larger adjacent to the top of the blade than at the area adjacent to the cutting teeth of the saw blade. Consequently, it should be apparent that there is no binding or interference with the movement of the saw blade cutting especially through material such as sheet rock, which as mentioned before, crumbles easily. Furthermore, the saw blade is made from harder steel than normal saw steel, and preferably of a non-rusting variety, the blade of the sheet rock saw will cut on both its forward and backward motion in a fast, clean and straight cut. As seen in FIGS. 1, 7 and 12, the bottom cutting surface 12a of the blade 12 has a broad cutting surface that cuts the material, such as wall board, across the entire width of the tooth, from point A to point B, as seen in FIG. 12.

In FIG. 6 it should be particularly noted that the saw blade, when passing through a saw cut in a gypsum board B in a forward and backward motion, will cause the gypsum particles or flakes to fall on either side of the board. Furthermore, since the saw blade 12 is made of premium grade steel it will last longer and is easier to sharpen on the job site. The tip 13 of the blade 12 is sharpened so that it can be used to scribe cutting lines on the boards without the necessity of securing another tool for that purpose, which saves both time and effort.

FIG. 8 is an enlarged view of the cutting teeth of the saw blade 12 as well as the large clean out areas between the teeth. Teeth pairs 28 are spaced and are adjacent to a clean out open area which is generally elliptical in shape and referred to by the reference numeral 30. The clean out areas 30 connected to adjacent teeth pairs 28 each having a curvilinear indention at its closed end having preferably a radius if 1/16". The opening of a clean out area is preferably 4/32". The teeth configuration of the saw follows in the same pattern along the cutting edge of the saw so that the cutting edges are spaced uniformly along the cutting surface of the instrument. In addition, both the front and rear edges 28a and 28b of each cutting edge are sharpened. The total height of the clean out is 3/16".

It should be apparent that other configurations of the saw blade cutting edge can be made which would be dependent upon the type of material that is to be cut. For example, in FIG. 9, more teeth per inch are shown than the construction shown in FIG. 8. However, the general configuration illustrated in FIG. 8 is maintained. As seen in FIG. 9 the angle Y is larger that the angle Z, as shown in FIG. 8, thus providing a broader cutting tooth in FIG. 9 than in FIG. 8. Consequently, the teeth of FIG. 9 are shorter than the teeth shown in FIG. 8. FIG. 9 is a view similar to FIG. 8 however, showing more teeth per inch on the saw blade resulting in different dimensions of the teeth as well as the clean out areas.

Figure 10:
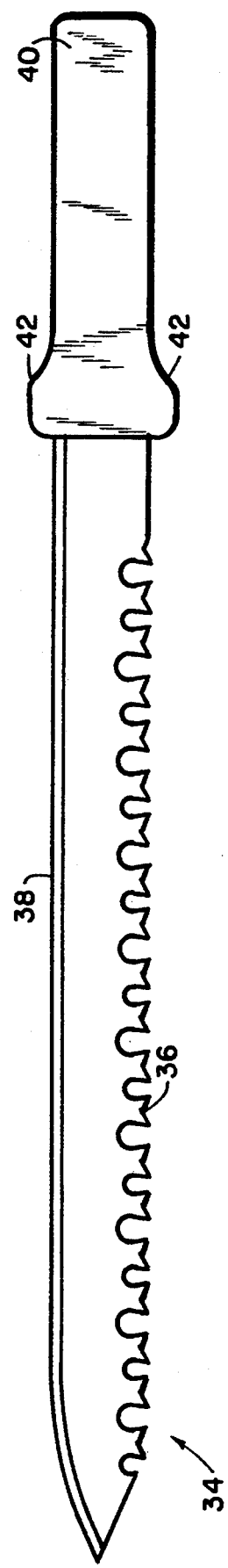
FIG. 10 is a side elevational view of a further embodiment of the present invention in which the top of the blade is a cutting edge.
Figure 11:
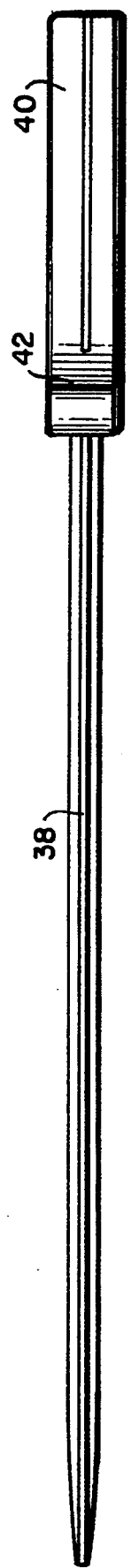
FIG. 11 is a top plan view of the embodiment shown in FIG. 10.

FIGS. 10 and 11 are another embodiment to the present invention which has a saw blade on one cutting surface and a sharpened edge functioning as a knife on the opposite surface. This construction results in an all purpose knife having cutting teeth 32 on the bottom edge of the type shown in FIG. 8. However, the whole saw blade construction is scaled down to be about ⅔ of the size of the teeth and clean out area as shown in FIG. 8. As a result, there is approximately 50% more teeth 34 in the structure shown in FIG. 10. The opposite edge of the all purpose knife which is referred to generally by the numeral 36 is provided with a sharpened edge 38. A handle 40 is provided for the knife 36 having thumb stops 42 and 44, respectively, on the upper and bottom portions of the saw blade.

Figure 13:
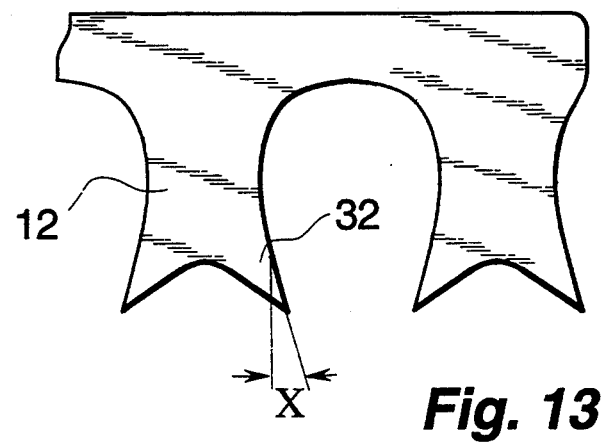
FIG. 13 is a fragmentary side elevation view of the teeth showing the cutting angle.

FIG. 12 shows clearly the broad cutting surface 12A of the individual tooth 12, which extends from point A to point B. FIG. 13 shows the configuration in profile of each cutting tooth edge 32 in which the angle X shows that the tooth edge 32 encounters the material to be sawed by means of a positive angle X resulting in the material to be cut not only by a planing action but also with a scooping action.

It should be evident that the construction shown in FIGS. 10 and 11 can be used with the cutting teeth 32 adjacent to the clean out areas for sawing wood, sheet rock and other building materials. Those cutting edges can also be used to cut, for example, frozen food while the opposite edge of the blade, which is sharpened, can be used as an all purpose knife. Consequently, this construction can be utilized for a variety of activities and is not necessary to change the cutting instrument or a saw for a different tool or device when different materials are to be cut.

The present cutting instrument in one embodiment is specifically designed for cutting sheet rock since ordinary carpenter's saws do not cleanly cut and trim sheet rock or dry wall because it is of different composition, hardness and texture than wood. Therefore, a saw having a configuration as set forth above including cutting teeth adjacent to clean out areas is necessary in order to accomplish a clean cut of sheet rock in which no binding occurs during the cutting procedure. The present saw accomplishes this objective, and also results in a longer lasting instrument than saws presently being used.

Although the present invention has been disclosed and described with reference to two embodiments thereof, it should be made apparent that other variations and modifications may be made, and it is intended in the following claims to cover each such variation and modification as follows within the true spirit and scope of the invention.

What I claim is:

1. A cutting instrument or tool comprising a handle, an elongated saw blade secured to said handle provided with a top and bottom edge and having a cutting surface on the bottom edge of said blade having spaced cutting teeth, each tooth having a tooth edge and provided with opposite side surfaces, a substantially large open area between adjacent teeth functioning as a clean-out, the top edge of said blade being thinner than the bottom edge cutting surface of said blade, and the opposite side surfaces of each tooth edge being flat and substantially parallel to each other, each tooth edge of the saw blade having a broad flat cutting surface that cuts a material in a substantial planing action across the entire width of said tooth, and all of said teeth being in line.

2. A cutting instrument as claimed in claim 1 wherein said open area is elliptical-shaped.

3. A cutting instrument as claimed in claim 1 wherein said blade is fabricated of high carbon steel and in which the cutting edges can be sharpened.

4. A cutting instrument as claimed in claim 1 wherein each of said teeth has a forward and rear cutting edge whereby said cutting instrument cuts without binding during both the forward and rearward movement thereof during cutting.

5. A cutting instrument as claimed in claim 1 wherein said saw blade is provided with a tip which is sharpened so that it is capable of functioning as a scriber.

6. A cutting instrument as claimed in claim 1 wherein said handle is bi-partite and said blade is provided with an end opposite said tip, and means removably securing said blade end between the two parts of said handle.

7. A cutting instrument as claimed 1 wherein said handle is provided with a thumb stop.

8. A cutting instrument as claimed in claim 1 wherein said blade is progressively thicker from the top of the blade to said cutting edges of said blade.

9. A cutting instrument as claimed in claim 1 further comprising the top of said blade being sharpened to a knife edge whereby said cutting instrument is a combination saw and knife.

10. A cutting instrument as claimed in claim 9 wherein said handle is provided with thumb stops on both the top and bottom of said handle.

11. A cutting instrument as claimed in claim 1 wherein each of said cutting teeth edges has a positive angle X for both planing and scooping out the material to be cut.

12. A saw blade for attachment to a handle having a bottom edge with a cutting surface provided with a single row of aligned teeth, each tooth having opposite side surfaces, a top edge on said saw blade, a substantially large open area between adjacent teeth functioning as a clean-out, said top edge of the blade being thinner than the bottom edge cutting surface of said blade, and the opposite side surface of each tooth edge being flat and substantially parallel to each other, the cutting surface of each of said aligned teeth having a predetermined width that cuts the material in a substantially planing action across the entire width of said tooth, and all of said teeth being in-line.

13. A saw comprising a handle, an elongated blade secured to said handle provided with a bottom edge and a top edge and having a cutting surface on the bottom edge of said blade provided with spaced cutting teeth, each of said cutting teeth having opposite side surfaces, each of said cutting teeth being disposed at an obtuse angle from the longitudinal axis of the saw blade, a substantially large open area between adjacent teeth functioning as a cleanout, the top edge of said blade being thinner than said bottom edge, the opposite side surfaces of each tooth being flat and substantially parallel to each other, and each tooth of the saw blade having a broad flat bottom edge having a predetermined width that cuts the material in a substantial planing action across the entire width of the tooth, and all of said teeth being in-line.

* * * * *